United States Patent
Suga et al.

(10) Patent No.: US 9,162,429 B2
(45) Date of Patent: Oct. 20, 2015

(54) DECORATIVE SHEET, PROCESS FOR PRODUCING THE SAME, AND INJECTION-MOLDED ARTICLE WITH DECORATIVE SHEET

(75) Inventors: Kazuhiro Suga, Saitama (JP); Shinnosuke Hirata, Saitama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 397 days.

(21) Appl. No.: 13/619,311

(22) Filed: Sep. 14, 2012

(65) Prior Publication Data
US 2013/0008600 A1 Jan. 10, 2013

Related U.S. Application Data

(62) Division of application No. 12/088,766, filed as application No. PCT/JP2006/319448 on Sep. 29, 2006, now abandoned.

(30) Foreign Application Priority Data

Sep. 30, 2005 (JP) ................................. 2005-288591

(51) Int. Cl.
| | |
|---|---|
| *B29C 45/14* | (2006.01) |
| *B32B 27/08* | (2006.01) |
| *B44C 1/17* | (2006.01) |
| *B32B 7/04* | (2006.01) |
| *B32B 7/12* | (2006.01) |
| *B32B 27/30* | (2006.01) |
| *B32B 27/32* | (2006.01) |
| *B29C 51/10* | (2006.01) |

(52) U.S. Cl.
CPC ........... *B32B 27/08* (2013.01); *B29C 45/14811* (2013.01); *B32B 7/045* (2013.01); *B32B 7/12* (2013.01); *B32B 27/302* (2013.01); *B32B 27/308* (2013.01); *B32B 27/32* (2013.01); *B44C 1/1729* (2013.01); *B29C 51/10* (2013.01); *B29C 2791/006* (2013.01); *B29K 2715/006* (2013.01); *B29K 2995/002* (2013.01); *B32B 2451/00* (2013.01); *Y10T 428/24851* (2015.01)

(58) Field of Classification Search
None
See application file for complete search history.

(56) References Cited

U.S. PATENT DOCUMENTS

| | | | |
|---|---|---|---|
| 5,676,981 A | 10/1997 | Miyazawa et al. | |
| 5,800,759 A * | 9/1998 | Yamazaki et al. | 264/163 |
| 5,925,208 A * | 7/1999 | Dronzek, Jr. | 156/257 |

(Continued)

FOREIGN PATENT DOCUMENTS

| | | |
|---|---|---|
| JP | 2000-238070 | 9/2000 |
| JP | 2000-280283 | 10/2000 |
| JP | 2005-219299 | 8/2005 |

*Primary Examiner* — Jill Heitbrink
(74) *Attorney, Agent, or Firm* — Fitch, Even, Tabin & Flannery, LLP

(57) ABSTRACT

A decorative sheet for injection-molding and decorating a resin simultaneously, the decorative sheet containing two resin sheets laminated on each other with at least one patterned layer intervening therebetween, and the two resin sheets having a difference in linear expansion coefficient of $4\times10^{-5}/°$ C. (41 to 50° C.) or less. Even after subjecting to three-dimensional processing, such as vacuum molding, the decorative sheet suffers no warpage, and can be easily released from a mold for the three-dimensional processing, and even when the decorative sheet is set in a mold for injection molding, the decorative sheet does not fall off from the mold, a resin injected does not permeate a gap between the outer surface of the decorative sheet and the mold, and the decorative sheet suffers no peeling between the sheets constituting the decorative sheet.

9 Claims, 2 Drawing Sheets

(56) References Cited

U.S. PATENT DOCUMENTS

| | | | |
|---|---|---|---|
| 6,187,233 B1 * | 2/2001 | Smith | 264/75 |
| 6,652,985 B1 * | 11/2003 | Tadokoro et al. | 428/520 |
| 6,896,756 B2 | 5/2005 | Ishii | |
| 2001/0053454 A1 * | 12/2001 | Higashi et al. | 428/520 |
| 2003/0087075 A1 * | 5/2003 | Peters et al. | 428/212 |

* cited by examiner

Fig. 4  BACKGROUND

DECORATIVE SHEET, PROCESS FOR PRODUCING THE SAME, AND INJECTION-MOLDED ARTICLE WITH DECORATIVE SHEET

This application is a Divisional application of application Ser. No. 12/088,766, having a filing date of Jul. 28, 2008 now abandoned, the contents of which are incorporated herein by reference in their entirety. Ser. No. 12/088,766 is a National Stage Application, filed under 35 USC 371, of International (PCT) Application No. PCT/JP2006/319448, filed Sep. 29, 2006.

TECHNICAL FIELD

The present invention relates to a decorative sheet that is set inside a mold, to which a resin is injected, so as to solidify the resin and simultaneously to adhere the decorative sheet to the surface of the resin, i.e., that is capable of injection-molding and decorating a resin simultaneously, a process for producing the decorative sheet, and an injection-molded article with a decorative sheet using the decorative sheet.

BACKGROUND ART

As a conventional process for producing an injection-molded article with a decorative sheet, it has been known that before placing a decorative sheet inside a mold for injection molding, the sheet is three-dimensionally processed by vacuum molding or the like, punched into a desired shape, and then interfit within a depression or the like in the mold for injection molding, followed by cramping the mold, and a molding resin is injected into the cavity to adhere integrally the simultaneous molding-decorative sheet to the surface of the molding resin. As another process, it has been known that a simultaneous molding-decorative sheet is placed inside a mold for injection molding, and then three-dimensionally processed by vacuum molding or the like to follow the depression of the mold for injection molding, and after cramping the mold, a molding resin is injected into the cavity to adhere integrally the simultaneous molding-decorative sheet to the surface of the molding resin (see, for example, Patent Document 1).

Various products have been proposed as the simultaneous molding-decorative sheet, and for example, a product having plural resin sheets laminated and a patterned layer has been proposed (see, for example, Patent Document 2).
Patent Document 1: JP-A-2000-238070
Patent Document 2: JP-A-2000-280283

DISCLOSURE OF THE PRESENT INVENTION

However, in the case where a decorative sheet having plural sheets laminated is used, the decorative sheet suffers warpage after subjecting to three-dimensional processing by vacuum molding or the like. In the case where a decorative sheet suffering warpage is used, there are such problems upon setting the decorative sheet in a mold for injection molding in that the decorative sheet falls off from the mold, the sheet is moved upon closing the mold, a resin thus injected permeates a gap formed between the decorative sheet and the mold although the sheet can be set in the mold, and the mold cannot be closed due to the sheet suffering warpage. FIG. 4 shows a state where the sheet having suffered warpage is set in the mold for injection molding.

The problems caused by warpage of the decorative sheet also occur in the method, in which the decorative sheet is placed in a mold for injection molding and then three-dimensionally processed by vacuum molding or the like to follow the depression of the mold for injection molding.

In a decorative sheet constituted by laminating plural sheets, even in the case where the same material is used as materials for the plural sheets, the warpage problem occurs due to factors of kinds and contents of a plasticizer and a filler contained in the materials. The extent of warpage becomes still more conspicuous in the case where sheets with different materials are laminated.

The present invention has been made in view of the problems, and an object thereof is to provide such a decorative sheet in that the decorative sheet suffers no warpage after three-dimensional processing and does not fall off from the mold, a resin injected does not permeate along the outer surface of the decorative sheet, and the decorative sheet suffers no peeling between the constituting sheets, the process for producing the decorative sheet, and an injection-molded article with a decorative sheet using the decorative sheet.

As a result of earnest investigations made by the inventors, it has been found that the problems can be solved with a decorative sheet containing plural resin sheets laminated on each other, the plural resin sheets having a difference in linear expansion coefficient of a certain value or less. The present invention has been completed based on the finding.

The present invention relates to:

(1) a simultaneous injection molding-decorative sheet capable of attaining injection molding of a resin and decoration simultaneously, the decorative sheet containing two resin sheets laminated on each other with at least one patterned layer intervening therebetween, the two resin sheets having a difference in linear expansion coefficient of $4 \times 10^{-5}/°$ C. (41 to 50° C.) or less, (2) the decorative sheet described in the item (1), wherein among the two resin sheets, a material for the resin sheet on a surface side is at least one selected from polyurethane, polyester, an acrylate resin, polyolefin and polycarbonate, and a material for the resin sheet in contact with a resin to be molded is at least one selected from a polyolefin, an acrylonitrile-butadiene-styrene resin (ABS resin), polycarbonate and polyester, (3) the decorative sheet described in the item (1) or (2), wherein the decorative sheet further contains an adhesive layer between the two resin sheets, (4) the decorative sheet described in one of the items (1) to (3), wherein the two resin sheets are laminated by a dry laminating method, a hot laminating method, an extrusion laminating method or a heat laminating method, (5) a process for producing a decorative sheet containing two resin sheets having a difference in linear expansion coefficient of $4 \times 10^{-5}/°$ C. (41 to 50° C.) or less, at least one patterned layer being provided between the resin sheets, and the process containing laminating the two resin sheets by a dry laminating method, a hot laminating method, an extrusion laminating method or a heat laminating method, and (6) an injection-molded article with a decorative sheet, the injection-molded article being produced by subjecting the decorative sheet described in one of the items (1) to (4) to three-dimensional processing and punching, and then molding the decorative sheet integrally with a molding resin by an injection molding method using a mold.

The decorative sheet of the present invention suffers no warpage even after three-dimensional processing, such as vacuum molding. Accordingly, the decorative sheet can be easily released from the mold for the three-dimensional processing, and even when the decorative sheet is set in the mold for injection molding, the decorative sheet does not fall off from the mold, and the resin injected does not permeate a gap between the outer surface of the decorative sheet and the mold. Furthermore, the decorative sheet suffers no peeling between the sheets constituting the decorative sheet.

BRIEF DESCRIPTION OF THE DRAWINGS

FIG. 4 is a diagram showing a state where a conventional decorative sheet having suffered warpage is set in a mold.

DESCRIPTION OF THE SYMBOLS

Figure 1:
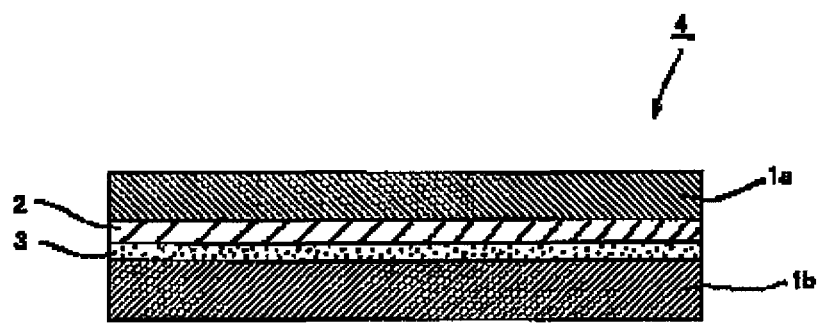
FIG. 1 is a schematic cross sectional view showing a constitution of a decorative sheet according to the present invention.

1$a$: first resin sheet
1$b$: second resin sheet
2: patterned layer
3: adhesive layer
4: decorative sheet
5: movable mold
6: fixed mold
7: cavity-forming surface
9: gate

BEST MODE FOR CARRYING OUT THE PRESENT INVENTION

The decorative sheet of the present invention contains two resin sheets laminated on each other with at least one patterned layer intervening therebetween, and is characterized in that the two resin sheets has a difference in linear expansion coefficient of $4 \times 10^{-5}$/° C. (41 to 50° C.) or less.

The decorative sheet of the present invention will be specifically described below with reference to FIG. 1.

As shown in FIG. 1, a decorative sheet 4 is constituted by a first resin sheet 1$a$, a second resin sheet 1$b$ and a patterned layer 2 with an adhesive layer 3, which is provided depending on necessity, and the difference in linear expansion coefficient between the two resin sheets (i.e., the first resin sheet 1$a$ and the second resin sheet 1$b$) constituting the decorative sheet 4 is $4 \times 10^{-5}$/° C. (41 to 50° C.) or less.

The difference in linear expansion coefficient between the two resin sheets constituting the decorative sheet 4 is $4 \times 10^{-5}$/° C. (41 to 50° C.) or less, whereby the decorative sheet suffers no warpage even after subjecting the decorative sheet 4 to three-dimensional processing, such as vacuum molding, and accordingly, various problems ascribable to warpage of the decorative sheet can be resolved. In the case where the difference in linear expansion coefficient between the two resin sheets of the decorative sheet 4 is more than $4 \times 10^{-5}$/° C. (41 to 50° C.), the decorative sheet suffers warpage with the resin sheet having a larger linear expansion coefficient outside. In the present invention, the difference in linear expansion coefficient between the two resin sheets may be $4 \times 10^{-5}$/° C. (41 to 50° C.) or less, and more preferably $1 \times 10^{-5}$/° C. (41 to 50° C.) or less, and it is particularly preferred that the difference in linear expansion coefficient between the two resin sheets is zero, i.e., the linear expansion coefficients of the sheets are identical to each other.

The linear expansion coefficient referred in the present invention is a value that is measured with an ordinary thermomechanical analysis equipment. As the measurement conditions, a sample obtained by cutting the sheets into a strip form of 3×15 mm is measured with a chuck distance of 10 mm and a load of 3 g in a tensile mode under a nitrogen atmosphere at a temperature increasing rate of 10° C. per minute, and an average linear expansion coefficient in a range of from 41° C. to 50° C. is designated as the measured value.

The two resin sheets (1$a$ and 1$b$) constituting the decorative sheet 4 are not particularly limited except for the difference in linear expansion coefficient, and the number of sheets laminated for forming the respective resin sheets, the materials of sheets used, and the like may be arbitrarily determined in consideration of the difference in linear expansion coefficient.

The materials of the two resin sheets (i.e., the first resin sheet 1$a$ and the second resin sheet 1$b$) constituting the decorative sheet 4 are not particularly limited, and can be arbitrarily selected in consideration of design, durability and the like demanded for the decorative sheet. Specific examples thereof include an acrylate resin, a fluorine resin, a polycarbonate resin, a vinyl chloride resin, a non-crystalline polyester resin, an acrylonitrile-butadiene-styrene resin and the like. These resins may be used solely or as a mixture of two or more of them.

Assuming that the resin sheet on the surface side of the decorative sheet 4 is the first resin sheet 1$a$, and the side in contact with the molding resin is the second resin sheet 1$b$, examples of the resin used in the first resin sheet 1$a$ include polyurethane; polyester, such as polyethylene terephthalate (PET), polybutyrene terephthalate (PBT), polyethylene naphthalate (PEN) and the like; an acrylate resin; polyolefin, such as polyethylene (PE), polypropylene (PP), a mixture thereof and the like; polycarbonate (PC); and the like, and an acrylate resin sheet is particularly preferably used among these since it has such physical properties as light resistance, transparency and the like.

The material of the second resin sheet 1$b$ may be appropriately selected depending on the kind of the molding resin, and a resin that is the same as or analogous to the molding resin is preferably used from the standpoint of adhesiveness. As the molding resin, in general, a polyolefin resin, such as polyethylene (PE), polypropylene (PP), a mixture of PE and PP and the like; an acrylonitrile-butadiene-styrene resin (ABS resin); polycarbonate (PC); a mixture of an ABS resin and PC; an acrylate resin; polystyrene; polyester, such as polyethylene terephthalate (PET), polybutyrene terephthalate (PBT), polyethylene naphthalate (PEN) and the like; and mixtures thereof are often used, and therefore the same resins as these resins are preferably used. Among these, polyolefin, an ABS resin, polycarbonate and polyester are preferred, and polyolefin and an ABS resin are particularly preferred.

The linear expansion coefficients of the resin sheets can be controlled, for example, by changing the mixed amount of an elastomer component for the case where the material for the resin sheet is an acrylate material, such as an acrylate resin (e.g., polymethyl methacrylate and PMMA) and acrylate rubber (e.g., ethyl methacrylate EMA, butyl methacrylate BMA, and the like), and by adding a filler, such as talc, calcium carbonate, silica, mica, glass fibers, carbon fibers and the like, for the case where the material for the resin sheet is a copolymer (such as a copolymer of styrene and butadiene, and the like). Specifically, in the case where an acrylate resin and a polypropylene resin are laminated, the linear expansion coefficient of polypropylene is generally larger than that of an acrylate resin, and the linear expansion coefficient of the polypropylene resin can be decreased by adding talk to the polypropylene resin, whereby the difference in linear expansion coefficient between the acrylate resin and the polypropylene resin can be set within a desired range.

The total thickness of the decorative sheet 4 is not particularly limited and is preferably from 0.03 to 2.00 mm. In the case where the thickness is 0.03 mm or more, the film follows a three-dimensional shape without breakage. In the case where the thickness is 2.00 mm or less, the film can follow minute grooves to prevent the draw depth on the end of the product from being decreased.

In view of the above, the total thickness of the decorative sheet 4 is more preferably from 0.2 to 1.0 mm.

The production process of the first resin sheet 1a and the second resin sheet 1b constituting the decorative sheet 4 is not particularly limited in the present invention, and ordinary processes having been known in the art may be employed, such as a so-called extrusion T-die method, in which a molding resin is extruded through a linear slit, a so-called calentering method, in which a resin is elongated with a heat roll, a so-called cast method, in which a liquid resin is cast and solidified in a mold, and the like.

Examples of the laminating method of the sheets (1a and 1b) include a so-called dry laminating method, in which the sheets having an adhesive containing an organic solvent coated thereon are adhered by evaporating and drying the solvent with hot air, a so-called hot laminating method, in which the sheet having a solid adhesive coated thereon by melting the adhesive under heating to 120 to 160° C. are laminated with a printed sheet, and then instantaneously cooled to integrate them, a so-called extrusion laminating method, in which a molding resin is extruded from an extruder to adhere with an extruded printed film into a film form, a heat laminating method, in which one or both of the films or sheets to be adhered are applied with a heat roll, and the like.

The decorative sheet 4 of the present invention has a patterned layer 2 between the resin sheets 1a and 1b as shown in FIG. 1. The patterned layer 2 is a layer formed by a method, such as printing and the like, on the entire or part of the surface of the resin sheet 1a, and is for displaying characters, figures, symbols and the like on the surface of the molded article, for providing a colored surface thereon, and the like. The patterned layer 2 is preferably constituted by at least one layer selected from the group consisting of a pigment ink layer containing a pigment and a resin binder, a glossy pigment layer containing a pearl pigment and a resin binder, and a dye ink layer containing a dye and a resin binder.

Examples of the method for forming the patterned layer 2 include an ordinary printing method, such as an offset printing method, a gravure printing method, a screen printing method and the like, a coating method, such as a roll coating method, a spray coating method and the like, and the like. The patterned layer 2 may also be formed with a vapor-deposited film formed by vapor deposition of a metal.

The decorative sheet 4 of the present invention may have an adhesive layer 3 depending on necessity as shown in FIG. 1. The adhesive layer 3 is a layer for improving the interlayer adhesiveness among the sheets constituting the decorative sheet 4 and for improving the adhesiveness to the molding resin. Examples of the resin for forming the adhesive layer 3 include a vinyl chloride-vinyl acetate copolymer resin, an acrylate resin, a urethane resin and the like.

The process for producing the injection-molded article with a decorative sheet of the present invention will be described.

The process for producing the injection-molded article with a decorative sheet of the present invention contains steps of setting the decorative sheet 4 having two resin sheets laminated in a mold for injection molding, and injecting a molding resin to solidify the molding resin and simultaneously to integrate and adhere the decorative sheet 4 to the surface of the molding resin. Since the difference in linear expansion coefficient between the sheets constituting the decorative sheet 4 is $4\times10^{-5}/°$ C. (41 to 50° C.) or less, the decorative sheet can be prevented from suffering warpage, and consequently, various advantages can be exhibited, such as reduction of defective molded articles, improvement in yield, reduction in cost, and the like.

Figure 2:
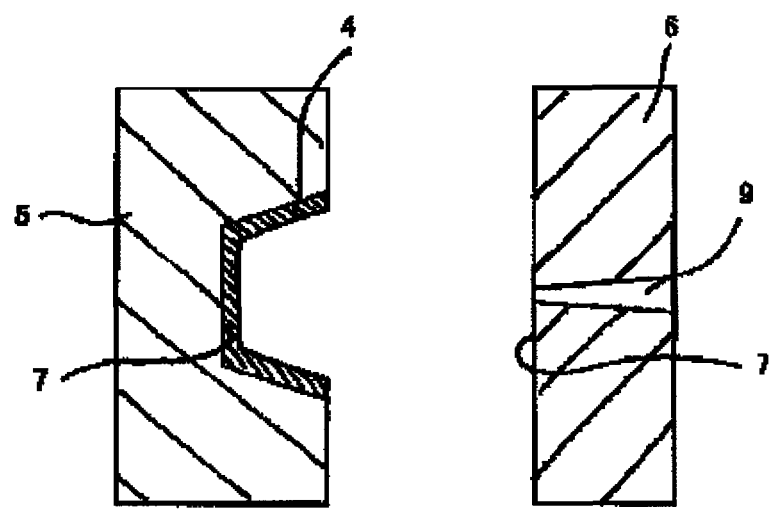
FIG. 2 is a cross sectional view showing one step in a process for producing an injection-molded article with a decorative sheet according to the present invention.

Specifically, the decorative sheet 4 is set in a mold for injection molding as shown in FIG. 2. Specific examples of the method for setting in the molding include such a method in that a rolled sheet of the decorative sheet 4 in a long strip form having been wound on a roll axis is placed above the mold for injection molding, and the decorative sheet 4 is fed from the rolled sheet to the mold to pass therethrough, and then wound on a roll axis of film winding means placed under the mold for injection molding. Another example thereof is a method of placing the decorative sheet 4 in a sheet form with a robot or by hand. In the case where the decorative sheet 4 having been placed in the mold is subjected to vacuum molding or the like, after positioning the decorative sheet 4 with respect to the mold, the decorative sheet 4 may be pressed onto the surface of the mold for injection molding with a cramping member before subjecting to vacuum molding.

In the process for producing an injection-molded article with a decorative sheet of the present invention, it is preferred that the decorative sheet 4 having two sheets laminated is subjected to three-dimensional processing and punching before setting in the mold for injection molding. In other words, before setting the decorative sheet 4 in the mold for injection molding, the decorative sheet 4 may be three-dimensionally processed into a three-dimensional shape by vacuum molding or the like with a separate mold from the mold for injection molding, and punched into a desired shape. Examples of the desired shape include a shape that agrees with the cavity-forming surface 7 of the mold for injection molding, and the like.

Examples of the method of three-dimensionally processing into a three-dimensional shape include a vacuum molding method, a pneumatic molding method, a pressure molding method of pressing heated rubber, a press molding method, and the like. The vacuum molding method herein is such a method in that the decorative sheet 4 is softened by heating to the softening point thereof or higher, and is adhered to the inner surface of the depression of the vacuum mold for injection molding by evacuating the space between the depression of the vacuum molding for injection molding and the decorative sheet 4, whereby the decorative sheet 4 is molded into the three-dimensional shape that agrees with the cavity-forming surface 7 of a movable mold 5 of the mold for injection molding.

Examples of the method of punching into a desired shape include a Thomson punching method, a pressing method with a mold, and the like. Examples of the punched shape include the outer peripheral shape of the decorative sheet 4, a hole having a prescribed shape, and the like. The decorative sheet may be punched simultaneously with the processing into a three-dimensional shape.

The mold for injection molding contains a fixed mold 6 having a gate 9, through which the molding resin is injected, a movable mold 5 and the like, and the fixed mold 6 and the movable mold 5 are closed to form single or plural cavities surrounded with the cavity-forming surfaces 7 of the fixed mold and the movable mold 5. The decorative sheet 4 placed in the mold for injection molding covers the cavity-forming surface 7. The cavity may be in such a shape that forms a hole in a resin molded article. The depression forming the cavity may be provided on either the fixed mold 6 or the movable mold 5. The mold may have a cramping member that fixes the decorative sheet 4 by pressing on the peripheral part of the depression of the movable mold 5. The cramping member may be provided in either the fixed mold 6 or the movable mold 5. The cramping member is difficult to use when the decorative sheet suffers warpage, but the cramping member can be used herein since the decorative sheet 4 used in the process of the present invention suffers no warpage.

Figure 3:
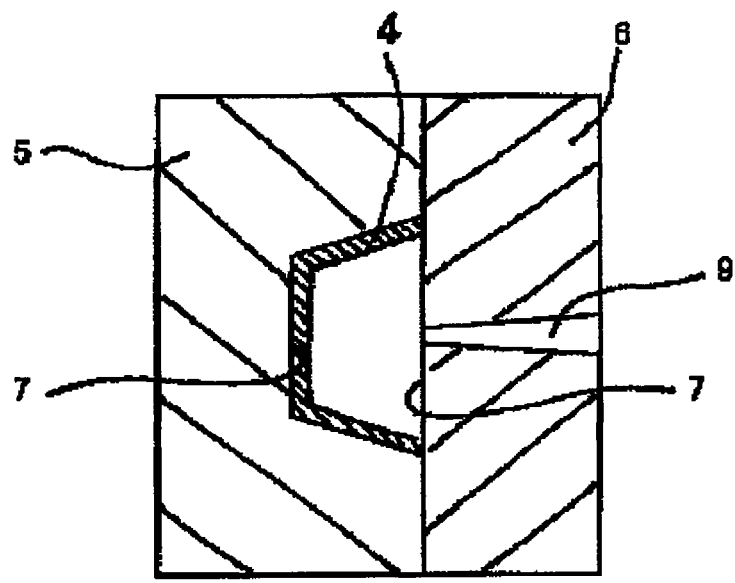
FIG. 3 is a cross sectional view showing another step in a process for producing an injection-molded article with a decorative sheet according to the present invention.
Figure 3:
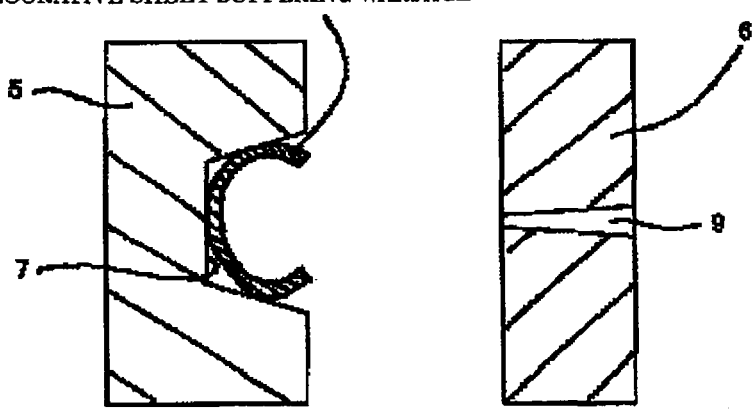

The mold is closed as shown in FIG. 3, and then the molding resin in a molten state is injected into the cavity to solidify the molding resin and simultaneously to integrate and adhere the decorative sheet 4 to the surface of the molding resin. Thereafter, an unnecessary part may be removed from the decorative sheet 4 having been integrated and adhered to the surface of the molding resin.

The molding resin used in the process of the present invention is not particularly limited, and for example, in the case where an acrylate resin sheet and a polypropylene resin sheet are used as the plural sheets (1a and 1b) constituting the decorative sheet 4, a polypropylene resin is particularly preferably used as the molding resin. This is because the decorative sheet 4 and the molding resin are formed of materials of the same series, and the adhesion force between them is improved.

EXAMPLES

Examples and Comparative Examples of the present invention will be described below.

As shown in Table 1, two kinds of acrylate resins (acrylate resins A and B) having different linear expansion coefficients were prepared as the first resin sheet. Three kinds of polypropylene resins (polypropylene resins A to C) having different linear expansion coefficient and an ABS resin were prepared as the second resin sheet. The linear expansion coefficients and the thickness of the resins are shown in Table 1.

Decorative sheets 4 shown in FIG. 1 were prepared with combinations of the first resin sheet and the second resin sheet shown in Table 1, and injection-molded articles were produced with the decorative sheets 4.

The values shown as the differences in Table 1 are calculation results of (linear expansion coefficient of first resin sheet)–(linear expansion coefficient of second resin sheet), and the symbols A, B, C and D shown as evaluations under the values are overall evaluations of the injection-molded articles thus molded.

Specifically, for evaluation of the decorative sheets, the symbol A means the case where no warpage occurs, B means the case where slight warpage occurs with no problem, C means the case where warpage occurs to provide possibility of problem, and D means the case where significant warpage occurs to cause problem on injection molding.

For evaluation of the injection-molded articles, the symbol A means the case where the decorative sheet is integrated and adhered to the desired position without problem upon molding, B means the case where the decorative sheet is integrated and adhered to the allowable position without problem upon molding, C means the case where such slight troubles occur in that the decorative sheet is slightly deviated, the decorative sheet is chipped upon molding, or the like, and D means the case where the decorative sheet is largely deviated from the desired position, or such significant troubles occur upon molding that may affect the yield.

TABLE 1

| | | First resin sheet | |
|---|---|---|---|
| | | Acrylate (A) Thickness: 125 μm Linear expansion coefficient: $8.5 \times 10^{-5}$ | Acrylate (B) Thickness: 125 μm Linear expansion coefficient: $11.7 \times 10^{-5}$ |
| Second resin sheet | PP(A) Thickness: 300 μm Linear expansion coefficient: $15.2 \times 10^{-5}$ | difference: 6.7 evaluation: D | difference: 3.5 evaluation: B |
| | PP(B) Thickness: 350 μm Linear expansion coefficient: $16.3 \times 10^{-5}$ | difference: 7.8 evaluation: D | difference: 4.5 evaluation: C |
| | PP(C) Thickness: 350 μm Linear expansion coefficient: $9.2 \times 10^{-5}$ | difference: 0.7 evaluation: A | difference: 2.5 evaluation: B |
| | ABS Thickness: 400 μm Linear expansion coefficient: $15.4 \times 10^{-5}$ | difference: 6.9 evaluation: D | difference: 3.7 evaluation: B |

It is understood from Table 1 that favorable results are obtained in all the cases where the difference in linear expansion coefficient (absolute value) between the first resin sheet and the second resin sheet is $4 \times 10^{-5}/°C$. (41 to 50° C.) or less, and particularly excellent results are obtained in the case where the difference is $1 \times 10^{-5}/°C$. (41 to 50° C.) or less. It is also understood that in the case where the difference exceeds $5 \times 10^{-5}/°C$. (41 to 50° C.), on the other hand, the decorative sheet suffers warpage, and some problems occur in the injection-molded article thus molded due to the warpage.

INDUSTRIAL APPLICABILITY

The decorative sheet of the present invention suffers no warpage even after subjecting to three-dimensional processing, such as vacuum molding, and therefore, the decorative sheet can be easily released from a mold for three-dimensional processing and does not fall off from a mold for injection molding, in which the decorative sheet has been set. Furthermore, a molding resin injected does not permeate a gap between the outer surface of the decorative sheet and the mold. Moreover, the decorative sheet suffers no peeling between the sheets constituting the decorative sheet.

The injection-molded article with a decorative sheet of the present invention produced by using the decorative sheet of the present invention can be favorably used as an interior equipment of an automobile, such as a console panel, a center cluster console, a switch base and the like, an exterior equipment of an automobile, such as a side mud guard with coated patterns, a bumper molding, a wheel cover, a molding and the like, and the like.

The invention claimed is:
1. A process for producing an injection-molded article having a decorative sheet and a molding resin, comprising:
   (i) subjecting the decorative sheet to three-dimensional processing in a first mold so as to mold the decorative sheet into a three-dimensional shape which agrees with a cavity-forming surface of a second mold for injection molding, and punching the decorative sheet,

(ii) thereafter, placing the decorative sheet in the second mold for injection molding, and
(iii) molding the decorative sheet integrally with the molding resin by an injection molding method using the second mold,
wherein the decorative sheet comprises two resin sheets, of different materials laminated on each other with at least one patterned layer intervening therebetween, and the two resin sheets have a difference in linear expansion coefficient of $1 \times 10^{-5}/°$ (41 to 50° C.) or less.

2. The process for producing an injection-molded article according to claim 1, wherein the decorative sheet having the three-dimensional shape is removed from the first mold and thereafter placed in the second mold.

3. The process for producing an injection-molded article as claimed in claim 1, wherein among the two resin sheets, a material for the resin sheet on a surface side is at least one selected from polyurethane, polyester, an acrylate resin, polyolefin and polycarbonate, and a material for the resin sheet in contact with the molding resin is at least one selected from a polyolefin, an acrylonitrile-butadiene-styrene resin (ABS resin), polycarbonate and polyester.

4. The process for producing an injection-molded article as claimed in claim 1, wherein the decorative sheet further comprises an adhesive layer between the two resin sheets.

5. The process for producing an injection-molded article as claimed in claim 1, wherein the two resin sheets are laminated by a dry laminating method, a hot laminating method, an extrusion laminating method or a heat laminating method.

6. The process for producing an injection-molded article as claimed in claim 3, wherein said material for the resin sheet on the surface side is an acrylate resin, and said material for the resin sheet in contact with the molding resin is a polyolefin.

7. The process for producing an injection-molded article as claimed in claim 6, wherein said polyolefin as said material for the resin sheet in contact with the molding resin is selected from the group consisting of polyethylene and polypropylene.

8. The process for producing an injection-molded article as claimed in claim 3, wherein said material for the resin sheet on the surface side is an acrylate resin, and said material for the resin sheet in contact with the molding resin is selected from the group consisting of polyolefin resins and ABS resin.

9. The process for producing an injection-molded article as claimed in claim 1, wherein the decorative sheet has a total thickness in a range of 0.03 to 2.00 mm.

\* \* \* \* \*